(12) United States Patent
Scott et al.

(10) Patent No.: US 6,484,260 B1
(45) Date of Patent: **\*Nov. 19, 2002**

(54) PERSONAL IDENTIFICATION SYSTEM

(75) Inventors: John D. Scott, Galson (AU); Terence Patrick Curtis, Kariong (AU)

(73) Assignee: Identix, Inc., Los Gatos, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,643

(22) Filed: Apr. 24, 1998

(51) Int. Cl.$^7$ ................................................. H04K 1/00
(52) U.S. Cl. ....................................... 713/186; 713/182
(58) Field of Search ...................... 380/23, 24; 382/124, 382/125, 126, 127, 115, 116, 313; 356/71; 340/825.34; 713/202, 182, 183, 184, 185, 186

(56) References Cited

U.S. PATENT DOCUMENTS

| | | | | |
|---|---|---|---|---|
| 5,623,552 A | * | 4/1997 | Lane | ........................... 382/124 |
| 5,770,849 A | * | 6/1998 | Novis et al. | ................. 235/492 |
| 5,872,834 A | * | 2/1999 | Teitelbaum | ............... 379/93.03 |
| 6,038,666 A | * | 3/2000 | Hsu et al. | .................... 713/186 |
| 6,040,783 A | * | 3/2000 | Houvener et al. | ..... 340/825.31 |
| 6,084,968 A | * | 7/2000 | Kennedy et al. | ............ 380/259 |

OTHER PUBLICATIONS

Schneier, Bruce. Applied Cryptography, Second Edition. Schneier. 1995. See pp. 52–65 and 185–187.*
TouchNet II, Database and Network Access Control, 1997.

* cited by examiner

Primary Examiner—Gail Hayes
(74) Attorney, Agent, or Firm—Fish & Richardson P.C.

(57) ABSTRACT

A portable, hand-held personal identification device for providing secure access to a host facility includes a biometric sensor system capable of sensing a biometric trait of a user that is unique to the user and providing a biometric signal indicative of the sensed biometric trait. A processing unit responsive to the biometric signal is adapted to compare the biometric signal with stored biometric data representative of the biometric trait of an enrolled person that is unique to the enrolled person, and to provide a verification signal only if the biometric signal corresponds sufficiently to the biometric data to verify that the user is the enrolled person. The verification signal includes information indicative of the enrolled person or the device. A communication unit, including a transmitting circuit, is adapted to transmit the verification signal to a host system.

27 Claims, 12 Drawing Sheets

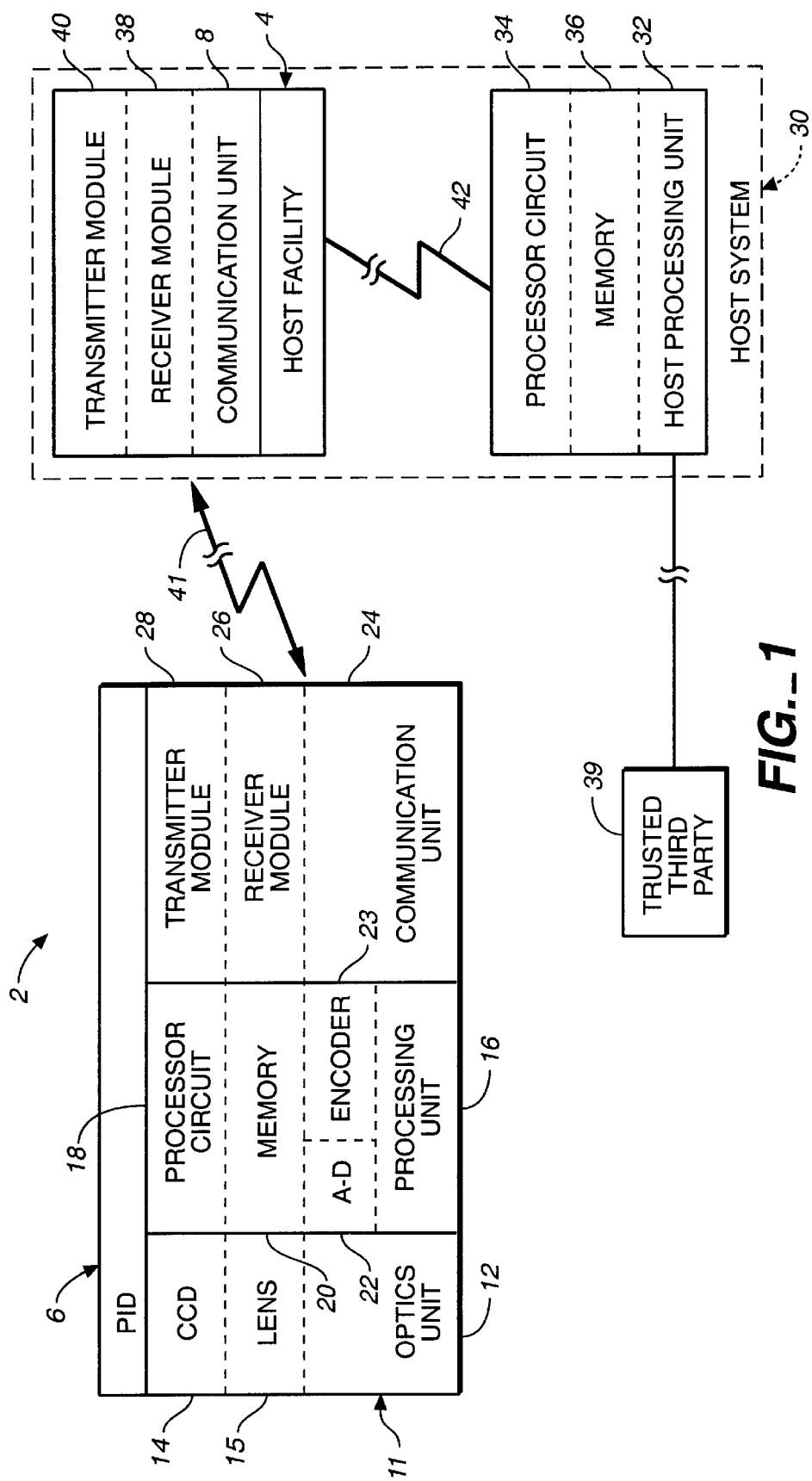
FIG._1

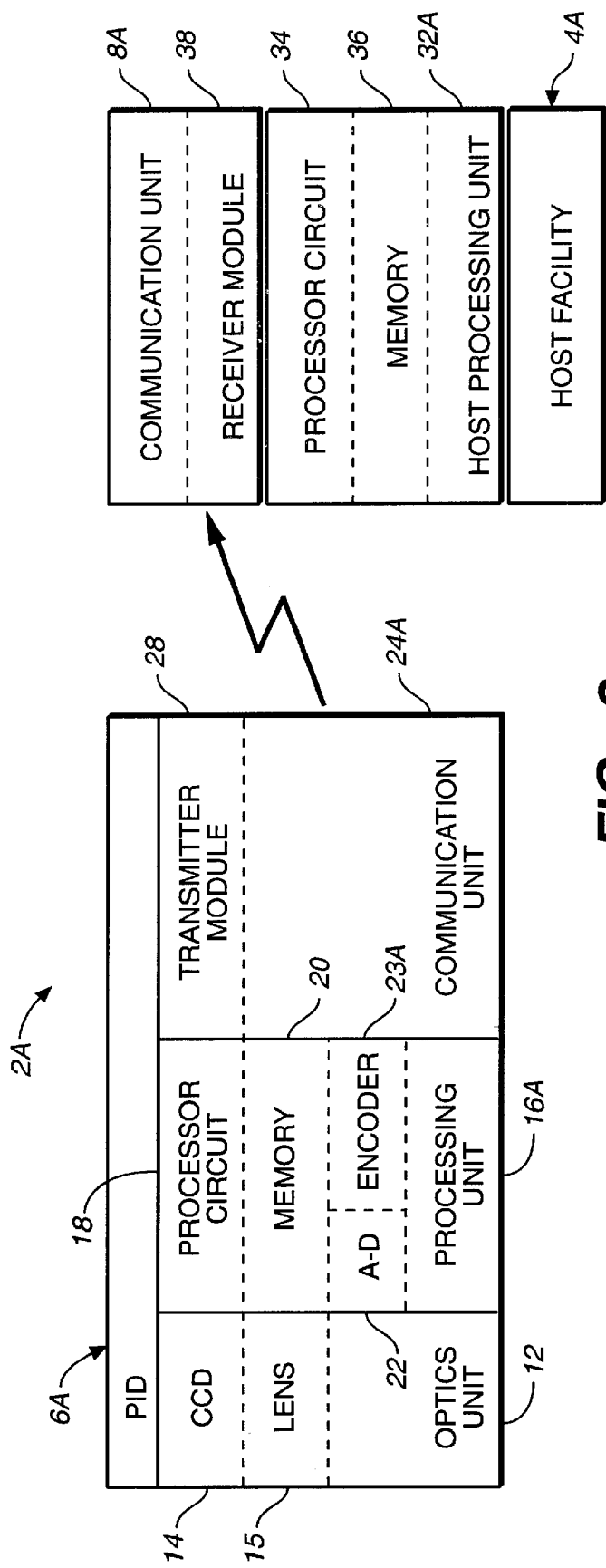
FIG._2

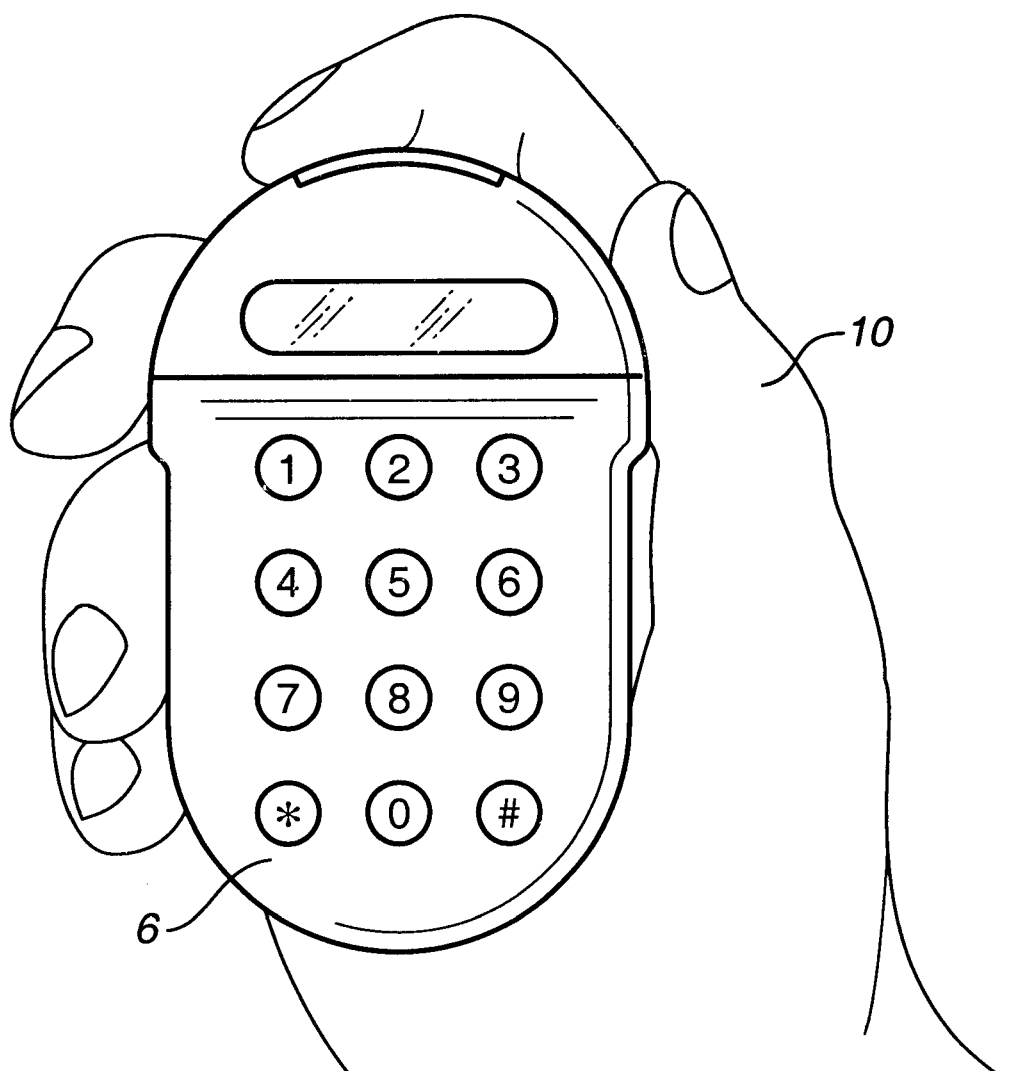
FIG._3

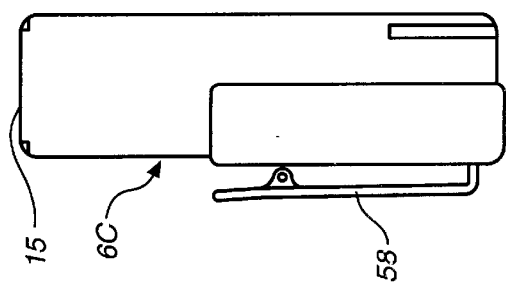
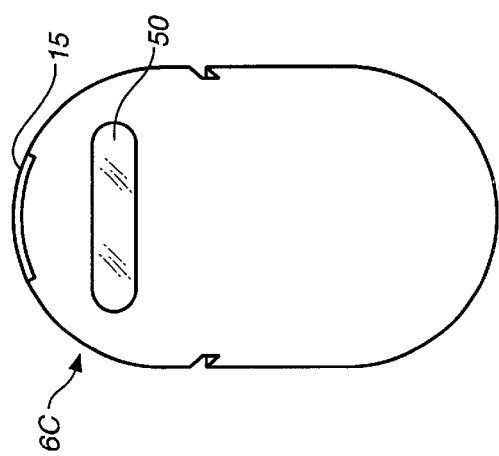
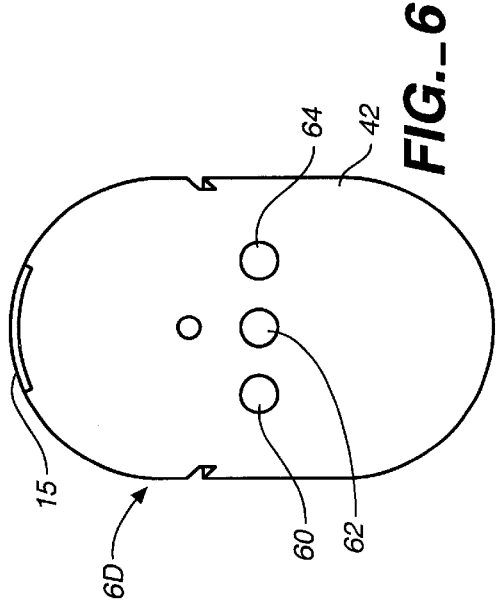
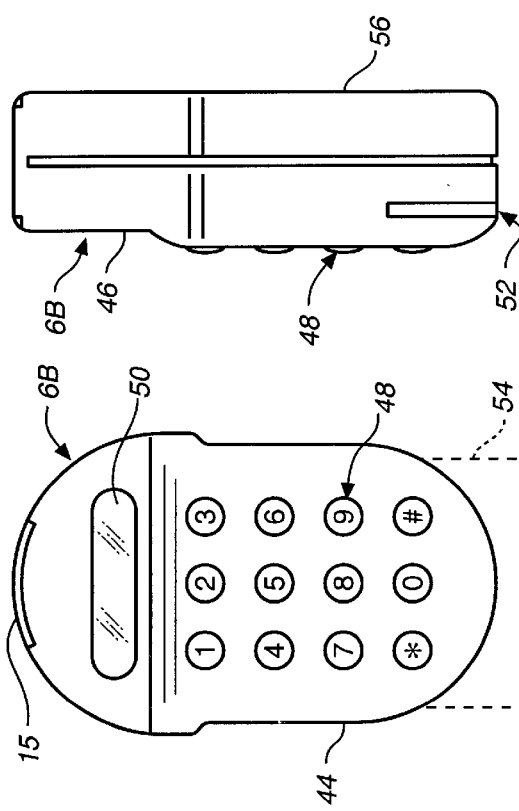
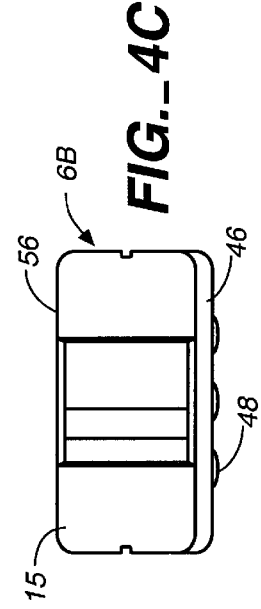
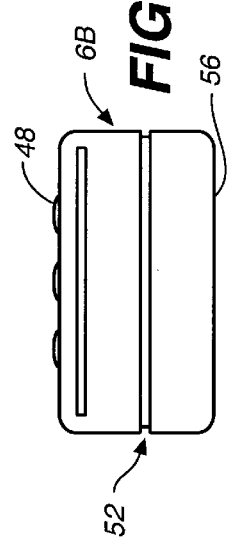

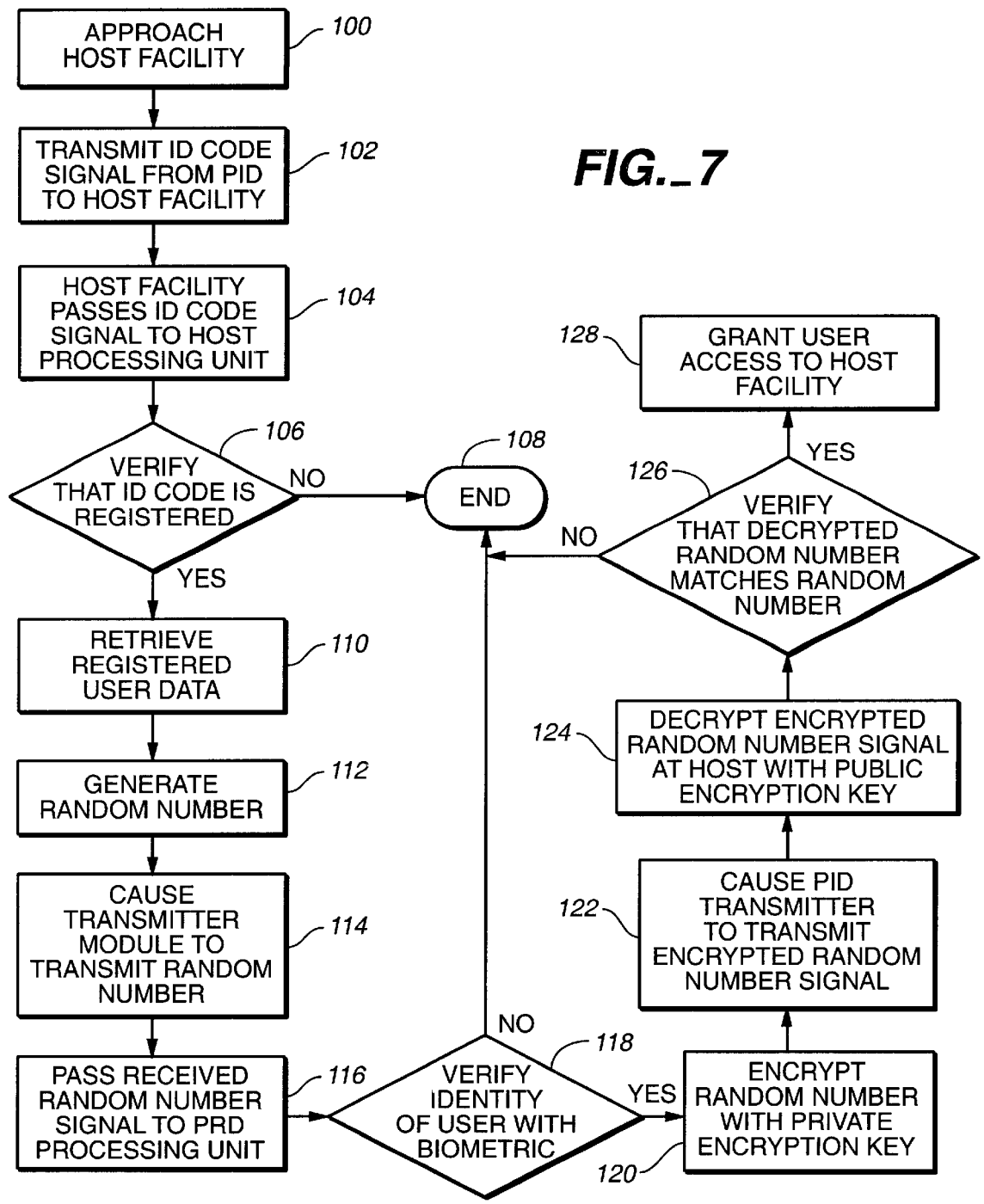
FIG._7

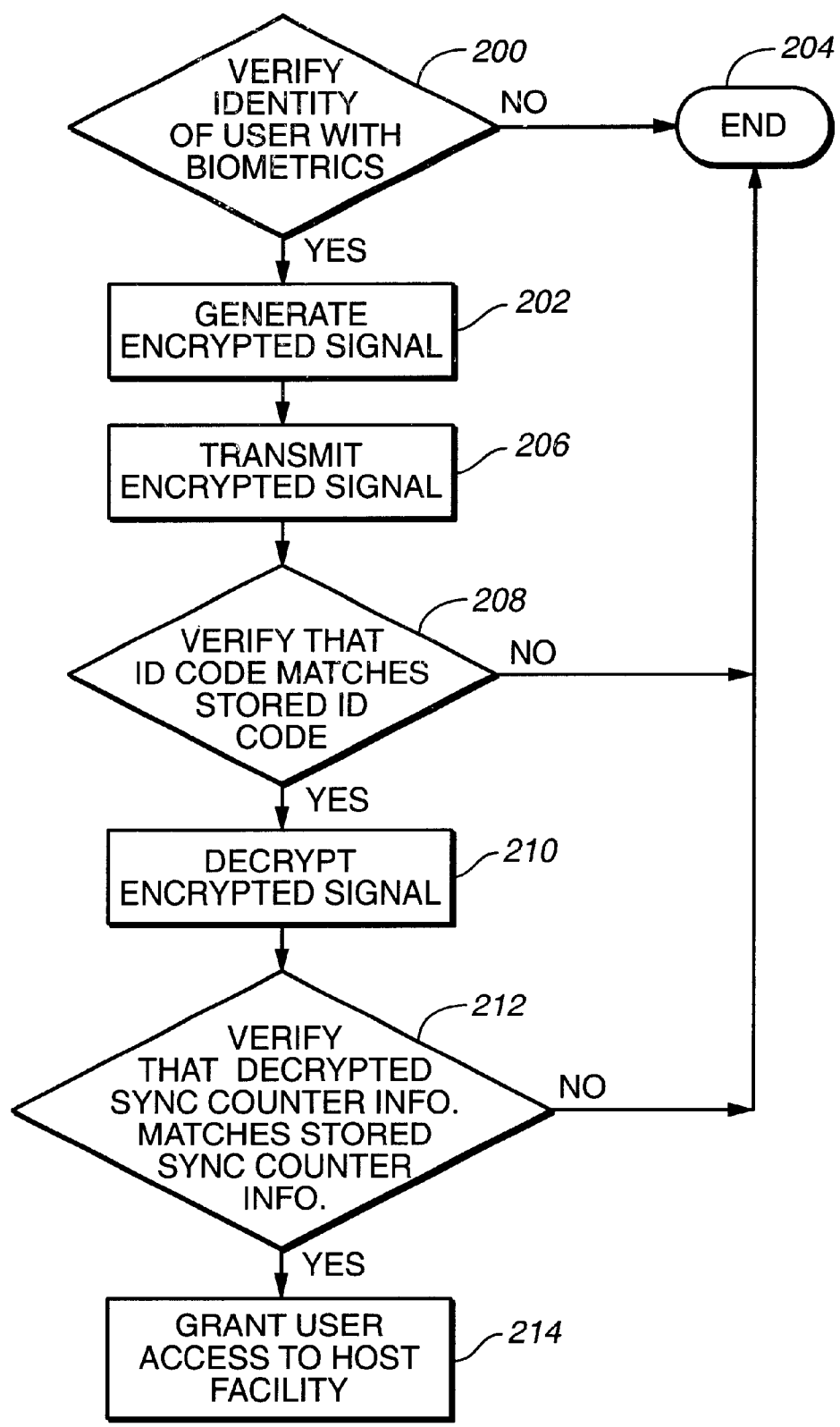
FIG._8

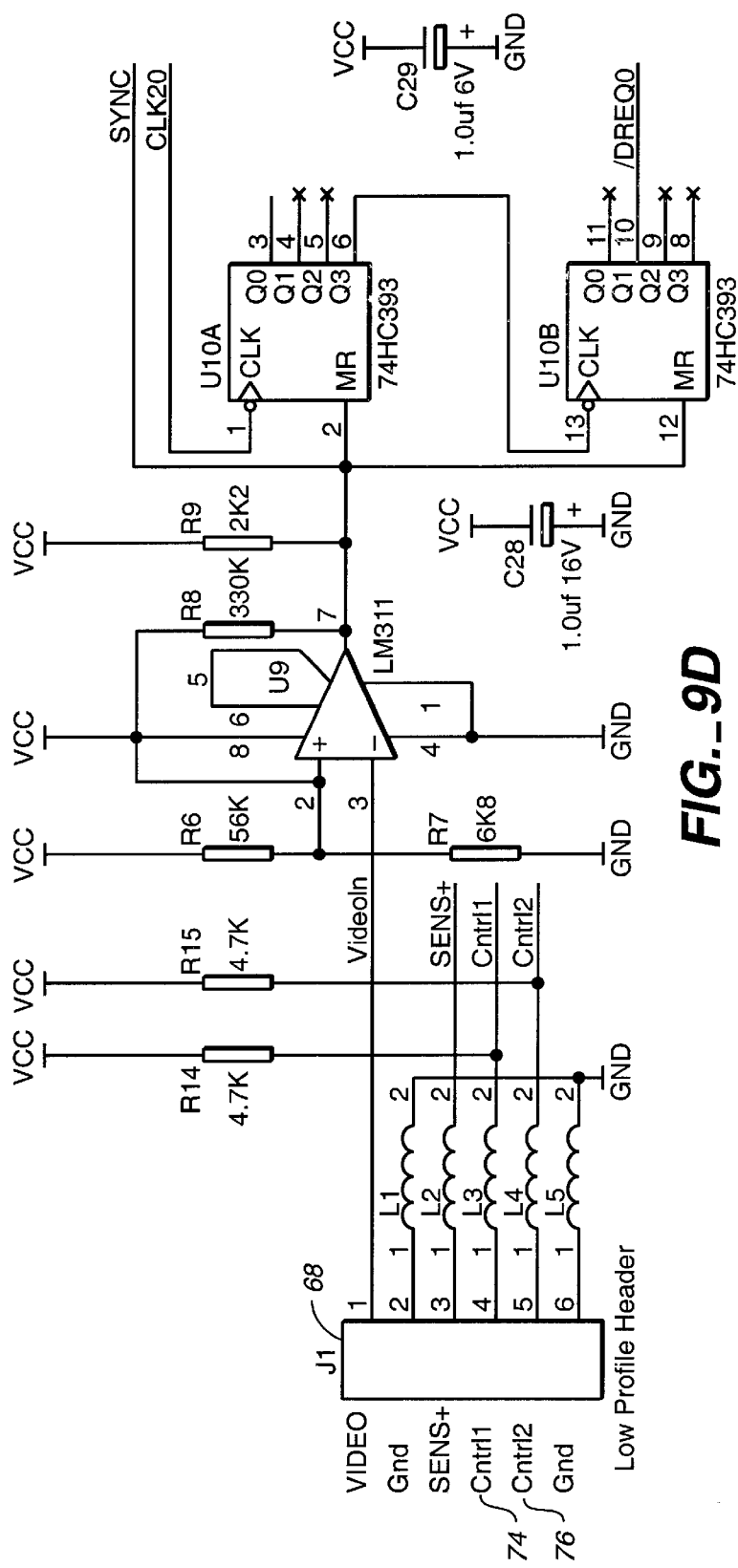
FIG._9D
FIG._9

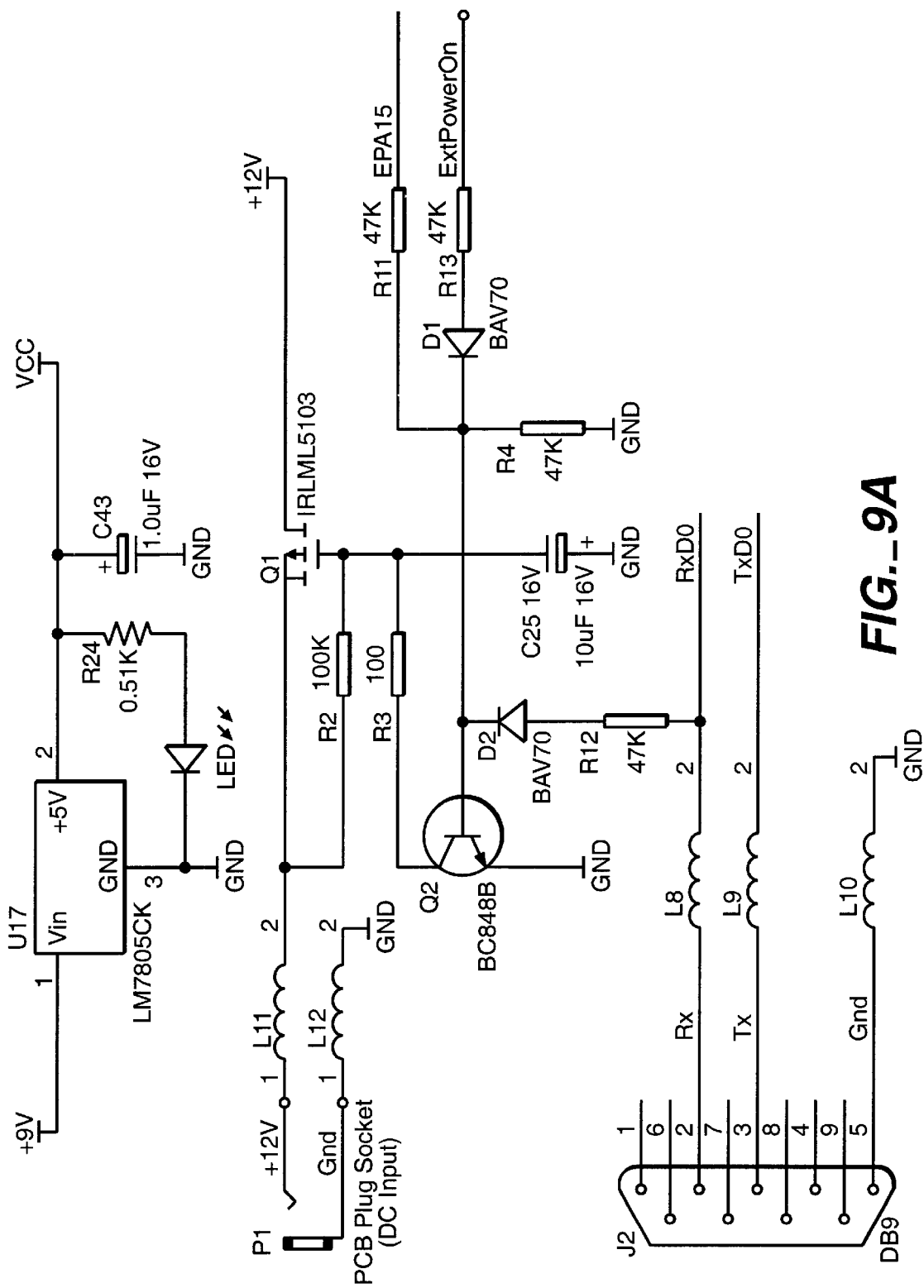
FIG._9A

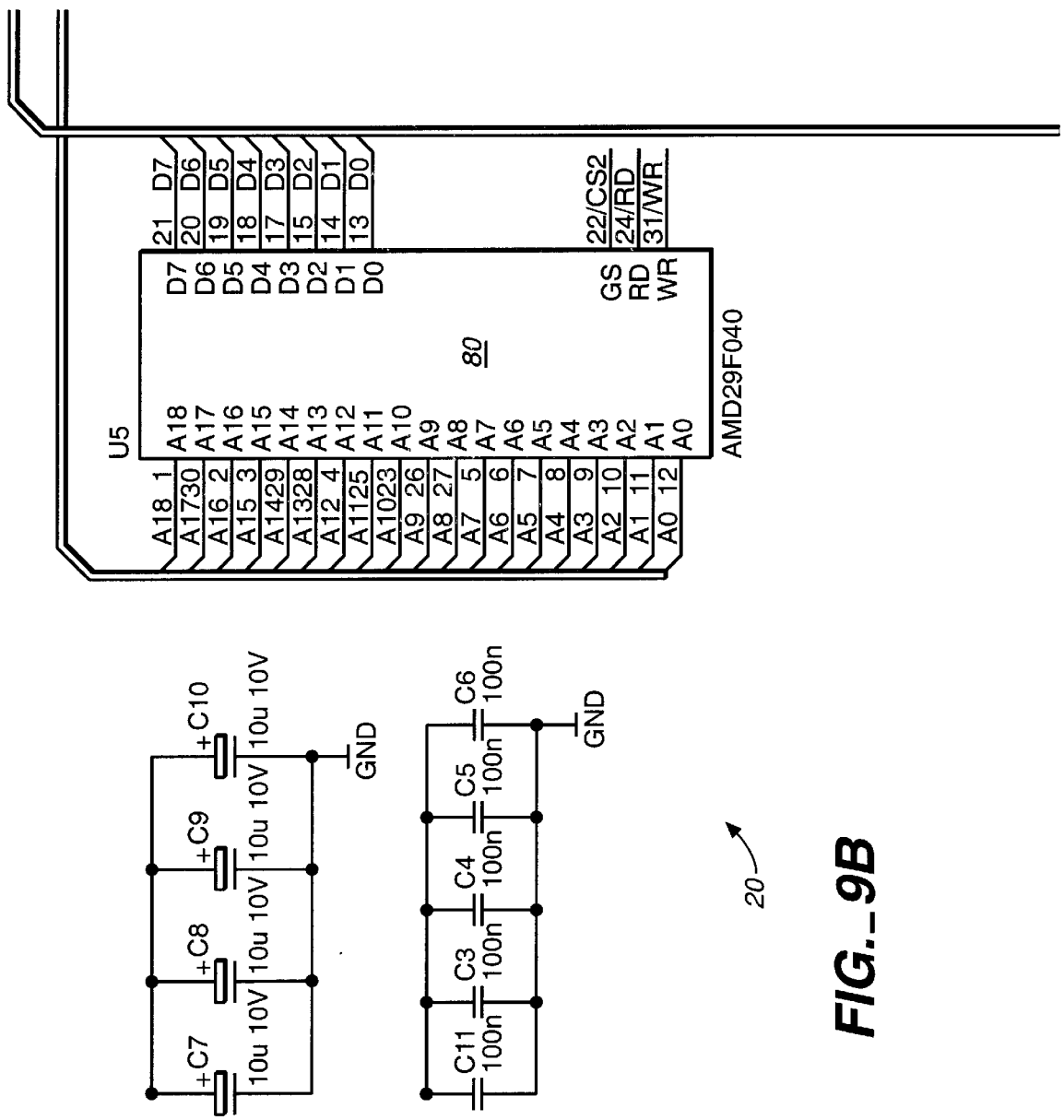
FIG._9B

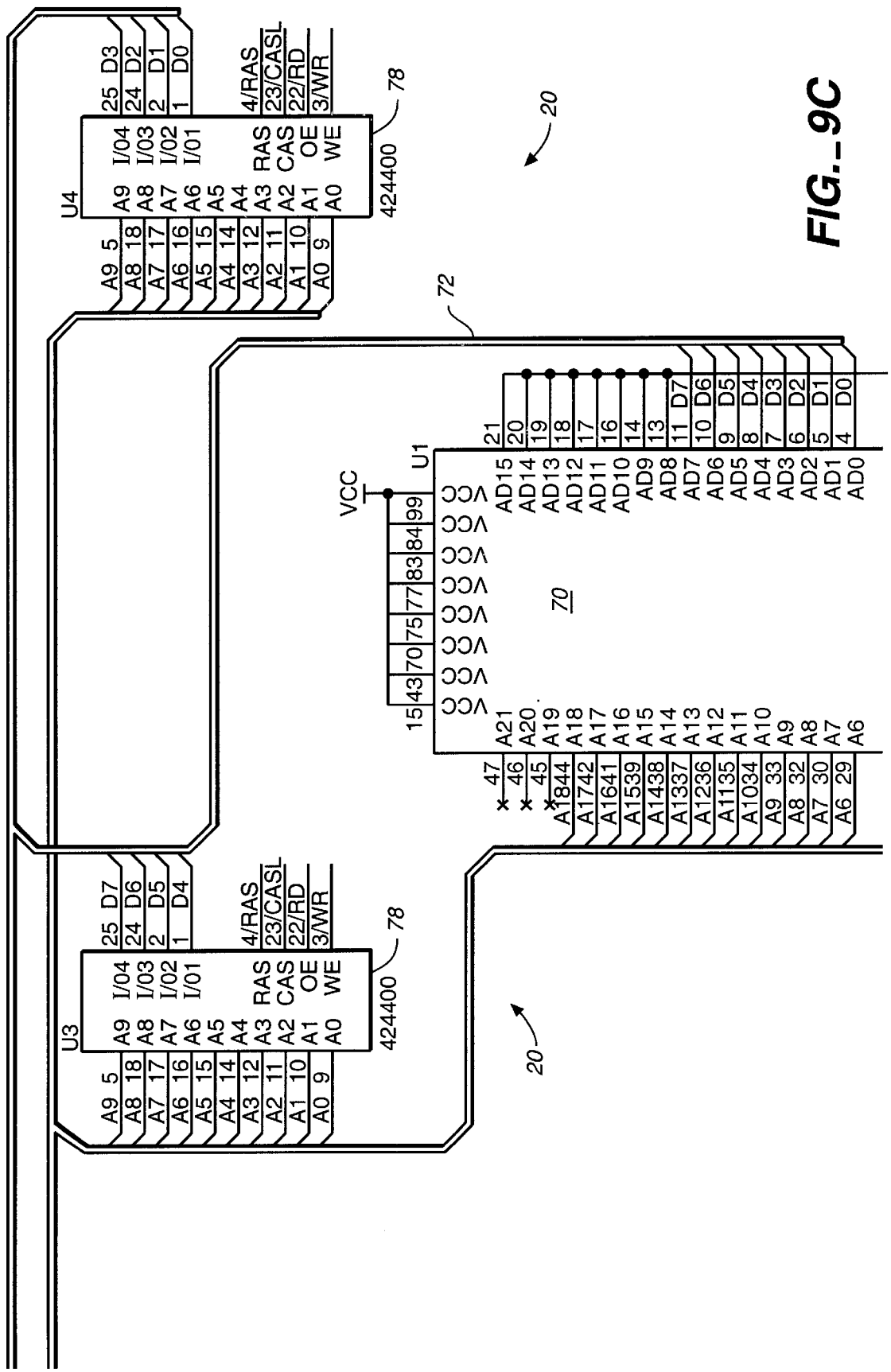
FIG._9C

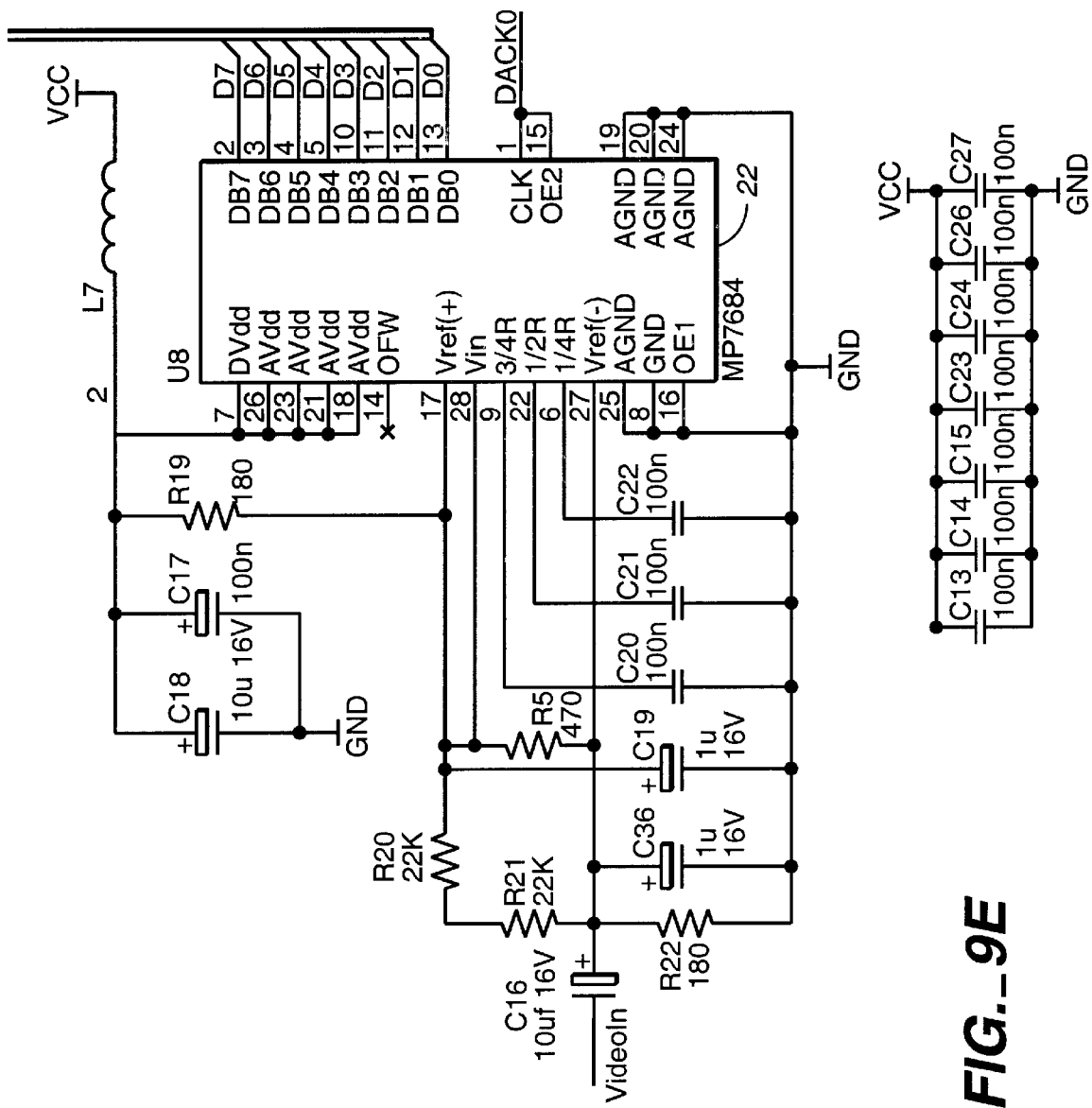
FIG._9E

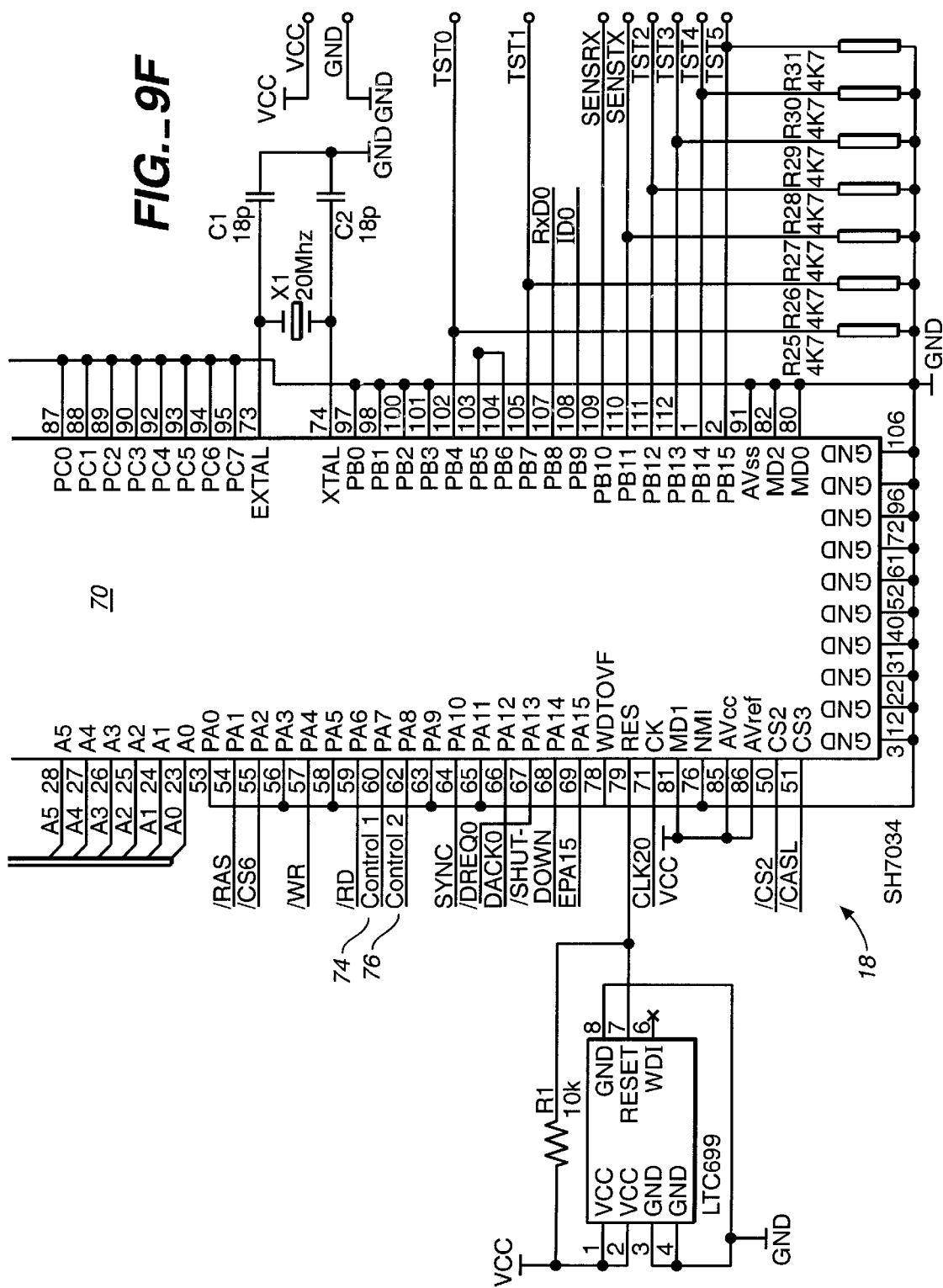

PERSONAL IDENTIFICATION SYSTEM

BACKGROUND OF THE INVENTION

The invention relates to a personal identification system employing a biometric sensor for allowing access to secure facilities.

Some security systems, such as home security systems and door locks, require a user to enter a fixed code into a device at a host facility before allowing a person access to the facility. Other systems, such as automated teller machines (ATM), require a person to submit an authorized card and also to enter a fixed code that is associated with the person's bank accounts. Automobile alarms, locks, and disabling devices, and garage door openers can be operated by pressing a button on a small remote device to transmit a coded signal to a receiving unit on the automobile or garage.

Each of these security systems can be operated by any person who is in possession of the fixed code, the card or the transmitting device, as the case may be. Therefore, each of these systems is inherently insecure. Where absolute security is essential, some host facilities employ a biometric sensor to measure a biometric trait of a person requesting access to the host facility. The biometric trait is a unique identifier of a person, and can be, for example, a person's fingerprint, voice pattern, iris pattern, or the like. The requesting person also enters other identifying information about himself. The measured biometric trait is compared with stored biometric data associated with the identified person and, if there is a match, the requesting person is allowed entry or access to the host facility.

In presently available biometric systems, each authorized person registers with the host facility by providing a sample of their biometric trait, for example, by having his fingerprint optically scanned into a host system data base. Each host facility must have a biometric sensor, access to the database of registered persons' biometric trait registration data, and a processing system capable of quickly searching the database and conducting the comparison to verify a person's identity. However, if the set of authorized persons is large, such a system would require a huge database to store the fingerprint images of all the authorized persons, and the identification process would become slower as the set of authorized persons increases.

SUMMARY OF THE INVENTION

According to one aspect of the invention, a portable personal identification device for providing secure access to a host facility includes a biometric sensor system capable of sensing a biometric trait of a user that is unique to the user and providing a biometric signal indicative thereof. A processing circuit responsive to the biometric signal is adapted to compare the biometric signal with stored biometric data representative of the biometric trait of an enrolled person that is indicative of the identity of the enrolled person. The processor provides a verification signal only if the biometric signal corresponds sufficiently to the biometric data to verify that the user is the enrolled person. The verification signal is indicative of the enrolled person or the device. A communication unit, including a transmitter circuit, is adapted to transmit the verification signal to a remote host system.

The communication unit is preferably adapted for remote communication with the host system via a wireless communication medium. The device can further include a display and a keypad.

The biometric sensor system can include a fingerprint sensor, a voice sensor, or any other type of biometric sensor.

The fingerprint sensor can include a platen adapted for placing a finger thereon. The fingerprint sensor can further include an optical image sensor, which may include a complementary metal oxide semiconductor (CMOS) optical sensor, a charge coupled device (CCD) optical sensor, or any other optical sensor having sufficient resolution to provide a signal indicative of a fingerprint image. In the embodiments with an optical sensor, the platen would include an optical platen, and the biometric sensor may also include a lens focusing light from the platen onto the optical sensor. The fingerprint sensor can alternatively include a direct contact sensor device, such as a capacitive sensor chip or thermal sensor chip. In these embodiments, the platen would be the surface of the sensor chip.

The processing unit can include a processor circuit, a memory and an encoder, wherein the memory stores the biometric data, and wherein the verification signal includes an encrypted signal encrypted by the encoder. In one embodiment, the encoder includes an encoding circuit, and the verification signal further includes an ID code indicative of the enrolled person or the device.

In another embodiment, the encoder comprises an encryption algorithm programmed into the processor. The encryption algorithm employs a private key indicative of the enrolled person or the device. In this embodiment, the communication unit can further include a receiver circuit. The memory can further store an ID code indicative of the enrolled person or the device. The processor unit can be further adapted to first cause the transmitter circuit to transmit an ID code signal indicative of the ID code to the host system. The receiver circuit can be adapted to receive a host response signal transmitted by the host system in response to the ID code signal. The processor unit employs the encryption algorithm and the private key to encrypt the host response signal to create the verification signal, and causes the transmitter circuit to transmit the verification signal to the host system only if the biometric signal corresponds sufficiently to the biometric data to verify that the user is the enrolled person.

In either of these embodiments, the memory can be located in a removable plug-in module, and the personal identification device further includes a socket adapted to receive the module.

According to another aspect of the invention, a portable, hand-held personal identification device for providing secure access to a host facility includes a housing. A fingerprint sensor system in the housing is capable of sensing a fingerprint of a user and providing a fingerprint signal indicative thereof. The fingerprint sensor system includes a platen on a surface of the housing adapted to receive a finger. A communication unit in the housing is adapted for wireless communication with a separate host system. The communication unit includes a transmitting circuit and a receiving circuit. A slot in the housing receives a removable smart card that includes a memory. The device can be combined with the smart card. The memory in the smart card stores a fingerprint template representative of the fingerprint of an enrolled person, and an ID code and a personal encryption key being associated with the device. A processing circuit in the device is adapted to cause the ID code signal from memory to be transmitted by the transmitting circuit. The processing circuit is further adapted to cause a host response signal received by the receiving circuit signal from the host system in response to the ID code signal to be encrypted according an encryption algorithm employing the personal encryption key and to cause the encrypted host response signal to be transmitted by the transmitting circuit only if the fingerprint signal corresponds sufficiently to the fingerprint template to verify that the user is the registered person.

According to yet another aspect of the invention, a method of providing secure access to a host facility includes the step of registering one or more persons with the host facility, including storing a unique ID code and a public encryption key for each registered person. The method also includes receiving a first transmission comprising a first user signal at the host facility, generating and then transmitting a random number signal from the host facility only if the first user signal represents one of the stored ID codes, receiving a second transmission comprising a second user signal at the host facility, decrypting the second user signal with the public encryption key associated with the registered person who is also associated with the stored ID code represented by the first user signal, and providing access to the host facility only if the decrypted second user signal represents the random number.

According to still another aspect of the invention, a method of providing access to a secure host facility only to registered persons includes registering one or more registered persons with the host system. Registering each registered person includes storing an ID code associated only with a portable hand-held device under the control of that registered person. The method also includes transmitting an ID code signal from a portable hand-held device to a host facility of the host system. The ID code signal represents an ID code associated with the transmitting device. Other steps include generating, at the host facility, a random number signal representing a random number in response to the ID code signal only if the ID code signal is representative of the ID code of the device controlled by one of the registered persons, and retrieving, with the host system, a public key associated with the one of the registered persons only if the ID code signal is representative of the ID code of the one the devices controlled by the one of the registered persons. Retrieving the public key can include retrieving the public key from a trusted third party. Further steps include transmitting the random number signal from the host facility to the transmitting device, and receiving the random number signal with the transmitting device. The method also includes generating a user fingerprint signal representing a fingerprint image of a user's finger being placed on a platen of the transmitting device, and comparing, with the transmitting device, the user fingerprint signal to a fingerprint template stored in the transmitting device, wherein the fingerprint template represents a fingerprint image of a person who is enrolled with the transmitting device. Other steps include encrypting the random number signal with the transmitting device, the random number signal being encrypted according to an encryption algorithm employing a private key associated only with the transmitting device, transmitting the encrypted random number signal from the transmitting device to the host facility only if the fingerprint image represented by the user fingerprint signal corresponds sufficiently to the fingerprint image represented by the fingerprint template to verify that the user is the enrolled person, decrypting the encrypted random number signal with the host system, including employing the retrieved public key, and providing the user access to the host facility only if the decrypted encrypted random number signal represents the random number.

Transmitting the ID code signal, transmitting the random number signal, and transmitting the encrypted random number signal each can include transmitting via a wireless transmission. Transmitting the ID code signal, transmitting the random number signal, and transmitting the encrypted random number signal each can further include transmitting via at least one of a modem, a cable access TV line, and a computer communication medium.

In yet another aspect of the invention, a method of providing a secure function at a host facility only to a registered person includes registering a person with the host facility by storing an ID code associated only with a portable registered device controlled by the registered person, learning a synchronization counter of the registered device, storing an encryption key associated with the registered device and associating the encryption key of the registered device with the stored ID code. The method also includes generating a user fingerprint signal representing a fingerprint image of a user's finger being placed on a platen of a portable user device, comparing, with the user device, the user fingerprint signal to a fingerprint template stored in the user device, the fingerprint template representing a fingerprint image of an enrolled person who is enrolled with the user device, and generating an access signal with the user device only if the fingerprint image represented by the user fingerprint signal corresponds sufficiently to the fingerprint image represented by the fingerprint template to verify that the user is the enrolled person, the access signal including an ID code associated only with the user device, button press information representing a requested function, and encrypted data encrypted with an encryption key associated with the user device, the encrypted data including a synchronization counter associated with the user device. The method then includes transmitting the access signal from the user device to the host facility, determining, with the host facility, if the ID code in the access signal matches the stored ID code, retrieving the encryption key of the registered device if the match is successful, employing the encryption key of the registered device to decrypt the encrypted data and determine the synchronization counter of the user device, comparing the synchronization counter of the user device with the synchronization counter of the registered device, and providing the requested function represented by the button press data only if the synchronization counter of the user device matches the synchronization counter of the registered device.

In another aspect, the invention provides a method of accessing a secure host facility, including sensing a biometric trait of a user that is unique to a user with a biometric sensor system of a portable device, and providing a biometric signal indicative of the biometric trait; comparing, with the portable device, the biometric signal with stored biometric data representative of the biometric trait of an enrolled person that is indicative of the identity of the enrolled person; providing a verification signal only if the biometric signal corresponds sufficiently to the biometric data to verify that the user is the enrolled person; and transmitting the verification signal and an ID code signal to a remote host system, wherein the ID code signal is indicative of an ID code associated only with the portable device, and wherein the host system provides access to the secure facility in response to the verification signal only if host facility determines that personal device associated with the ID code belongs to a registered person.

The system can be employed to provide secure access to a variety of different types of host facilities. The system can be used to replace security systems employing key card entry, fixed code entry, or a combination of key card and fixed code entry, which are currently employed, for example, with ATM's, gate and garage door openers, burglar alarm systems, point of sale (POS) devices, hotel room locks, and the like. The system can also be configured for use with automotive remote key entry (RKE) systems, automotive alarm systems, and automotive immobilizers.

The personal identification device and system of the invention has several advantages. The system is very private. Persons' biometric data, such as a fingerprint, are not stored in a central database, as with prior art systems using fingerprint identification for security. An electronic template of a user's fingerprint is stored only with their own personal identification device, and is used only for verifying the user's fingerprint. In the embodiment with two-way communication, the host facilities store only an ID code and a public key for each registered person. The ID code may be the serial number of the device, and the public key can be retained by a trusted third party. The private key used by the device is never disclosed.

The personal identification device is compact, being about the same size as an electronic pager. With advances in technology, it could be made even smaller. The personal identification device can be configured such that all the information that is associated with the user, i.e., the ID code, the personal encryption key, and the fingerprint template, is stored in a smart card, which can be transferred between identical devices having the image capture electronics, processing circuit, communication module and power supply. This enables the user to switch devices when one is worn out or broken without having to reregister.

The host system can be installed at host facilities with a minimal expenditure compared with current systems employing fingerprint identification for security. The biometric sensor is installed in each personal identification device, rather than with the host facility. This configuration also makes retrofitting existing security systems for use with the personal identification device a relatively simple procedure. The point of contact is with the personal identification device, which makes the present system more feasible for use at exposed, public locations, such as with automated teller machines, parked automobiles, and gate entries, where the weather and vandalism can be problems. This also makes the system of the invention more sanitary than other systems that require a person to operate a public terminal, keypad, or fingerprint scanner.

Because each user carries his own fingerprint template in the personal identification device, users can "roam" to many different applications and host facilities without the need to enroll the template at each site. They only need to register prior to use. This can be done over the phone or over computer communication lines, such as the Internet, if only medium level security is required.

The user has total control over the procedure for accessing a host facility. The ID cannot be read unless the user presses the fingerprint reader. The random number transmission and the encrypted random number transmission cannot be "scanned" as the random numbers are different each time access to a host facility is requested. The personal identification device can be used in conjunction with conventional telephone lines or computer network communication lines without any risk of theft.

Personal identification devices could be sold via any retail outlet, for example, as a shrink wrap product. As the units are manufactured with unique ID codes and private keys there is no need to control the sale in any way.

Unlike prior art biometric identification systems, the user is already enrolled by the first use of the personal identification device. This completely eliminates the delays and problems associated with enrolling large numbers of users and storing each user's biometric data.

BRIEF DESCRIPTION OF THE DRAWING

FIG. 1 is a block diagram of a security system according to the invention.

FIG. 2 is a block diagram of another embodiment of a security system according to the invention.

FIG. 3. is a perspective view of a personal identification device according to another feature of the invention.

FIGS. 4A, 4B, 4C, and 4D are respective front, side, top and bottom views of an embodiment of a personal identification device.

FIGS. 5A and 5B are respective front and side views of another embodiment of a personal identification device.

FIG. 6 is a front view of a third embodiment of a personal identification device.

FIG. 7 is a flow diagram illustrating an embodiment of a method of accessing a host facility with a personal identification device.

FIG. 8 is a flow diagram illustrating another embodiment of a method of accessing a host facility with a personal identification device.

FIG. 9 is a schematic diagram of an embodiment of the processor unit.

DETAILED DESCRIPTION OF THE INVENTION

Referring to FIG. 1, a security system 2 provides access to one or more secure host facilities 4 only to registered persons. A host facility 4 may be a bank, a store, a military base, a computer system, an automobile, a home security system, a gate, or any other facility where it is desired to restrict access to selected individuals. Each registered person uses a battery powered, portable personal identification device (PID) 6, which communicates with a communication unit 8 located at each host facility 4. PID 6 is small enough to carry on ones person, being similar in size to a hand-held pager. An example of a PID 6 is shown being held in the palm of a man's hand 10 in FIG. 3.

PID 6 includes a biometric sensor. In the described embodiment, a biometric sensor 11 includes an optics unit 12 having a CMOS optical sensor imaging device 14, and an exposed optical platen 15. Imaging device 14 can also be a CCD imaging device. A lens (not shown) may also be used to focus an image from a surface of platen 15 onto imaging device 14. PID also includes a processing unit 16. Processing unit 16 includes a processor circuit 18, an external memory 20 and may include an analog-to-digital converter circuit (A/D) 22. Some CMOS optical sensors provide a digital output signal, which eliminated the need for A/D 22. PID 6 further includes a communication unit 24, which has a transmitter module 28 and a receiver module 26.

Memory 20 stores information that is specific to processing unit 16. Memory 20 stores an ID code that is set in PID 6 by the manufacturer. The ID code of a device, which may be the device serial number, is unique to each device. Memory 20 also stores a fingerprint template that is generated by processing unit 16 from a fingerprint image signal provided by optics 12 unit when an individual first enrolls into PID 6, as will be described in detail below. That fingerprint image signal is representative of an image of a fingerprint of the enrolled individual. The fingerprint template is a data set that is representative of features of the enrolled individual's fingerprint. The fingerprint template is normally not changed once it is established in memory 20. In some embodiments, PID 6 may include a serial port (not shown), which can be used to plug into a computer to update or change the fingerprint template. For security purposes, PID 6 would be used to perform an identification verification before allowing such a change.

Processing unit 16 also includes an encryption algorithm incorporated into an encoder 23. In the embodiment illustrated in FIG. 1, the encryption algorithm is programmed into processor circuit 18. A private key that is stored in memory 20 is used with the encryption algorithm for encryption. The private key can be set into memory by the manufacturer, and is specific to each PID 6. Different PIDs 6, which have different processing units 16, will typically have different private keys. The encryption algorithm, on the other hand, can be the same for all PID's 6.

Host facility 4 is part of a host system 30. Host system 30 will typically be bank ATM systems, point of sale systems, and the like. Host system 30 also includes a host processing unit 32, which has a processor circuit 34 and memory 36. Communication unit 8 in host facility 4 includes a receiver module 38 and a transmitter module 40. Host processing unit 32 may be located with host facility 4, or may be located at a remote location, where it may also serve other host facilities 4 in a distributed network 42.

Memory 36 stores ID codes of enrolled individuals who have registered with host system 30. Memory 36 also stores public keys associated with respective ones of the stored ID codes. By employing the correct public key associated with a specific ID code, host processor circuit 34 can decrypt a signal that has been encrypted according to the encryption algorithm and personal key associated with the specific ID code, in a manner known in the encryption arts. The public key can also be stored with a trusted third party 39, which provides this service for several host systems in a known manner.

Signals 41 can be transmitted between PID 6 and host facility via any wireless transmission method. Transmission can be via RF, infrared, induction, sound, or the like. In this embodiment, PID communication unit 24 and host communication unit 8 will normally have a short transmission range of approximately a meter or less; however, longer ranges can be used as well. Hard-wire transmission methods can also be employed, either alone or in combination with a wireless transmission method. For example, transmission can employ dial tone modulation frequency (DTMF) (tone transmission) via a conventional phone system, employ a cable TV line in conjunction with the cable remote control system, or employ a computer communication medium, such as the Internet or a private network. PID 6 can employ more than one transmission/reception mode, such as, for example, an RF and a DTMF unit.

In another embodiment of a security system 2A, shown in FIG. 2, a PID 6A includes most of the features of PID 6 described above with reference to FIG. 1, with some significant differences. Note that features that system 2 has in common with system 2A are labeled with the same reference numerals in FIGS. 1 and 2, which convention is continued in the remainder of the FIGS. and in the following description. One difference is that communication module 24A lacks receiver module 26. Also, encoder 23A includes an encoder chip, for example, the HSC200 or HSC300 KeeLoq® Code Hopping Encoder, available from Microchip Technology, Inc. of Chandler, Ariz., that contains the encryption algorithm. Security system 2A includes a host facility 4A in which host processing unit 32A is located at the same site as host facility 4A. Host system communication unit 8A includes a receiver module 38, but does not include a transmitter module.

The embodiment illustrated in FIG. 2 will typically be employed with systems such as garage door openers, automobile security systems, door locks, and the like. As such, PID communication module 24A will have a longer transmission range than communication module 24 in the embodiment illustrated in FIG. 1.

Encoder 23A includes an ID code, which may be a serial number of encoder 23 or PID 6A. Encoder 23A also includes a synchronization counter, an encryption key and an encryption algorithm that employs the encryption key. Host system 4A must "learn" the ID code and the synchronization counter for each PID 6A which is used to access a function of host system 4A. Host system 4A must also know the encryption key.

Referring now to FIGS. 4A–4D, one embodiment of a PID 6B, which includes all the features also shown in FIG. 1, includes a housing 44 similar in size to a personal pager or a small cellular telephone. A front side 46 includes a keypad 48 for entering data and commands, and a liquid crystal display 50 for displaying data being entered with keypad 48 and for displaying status signals to the user. Keypad 48 can be eliminated in some models where programmability is not required. Platen 15 is located at the top of PID 6B, and is contoured for a finger. Platen 15 is also slightly recessed in the housing to provide some protection from scratching. A back side 56 of PID 6B includes a battery cover (not shown) and apertures for a DTMP speaker (not shown). A serial port can be included under the battery cover.

Housing 42 includes a slot 52 for receiving a smart card 54, which is shown in shadow being fully inserted into slot 52 in FIG. 4A. Smart card 54 includes external memory 20, and can be removed from one housing 42 and used in a new housing 42. Because memory 20 contains all the personal information, i.e., the private key, the ID code, and the fingerprint template, the smart card can be used with a different PID housing 42 without having to re-enroll the user or reregister any user information with host systems. Some models in which memory 20 is hard-wired inside housing 42 would not include smart card slot 52.

FIGS. 5A and 5B illustrate an embodiment of a PID 6C in which keypad 48 and smart card slot 52 are not included. PID 6C does, however, include platen 15, display 50, and a belt clip 58, which could be included in any model.

FIG. 6 illustrates an embodiment of a PID 6D which is structured similar to the embodiment illustrated in FIG. 2, for uses such as a garage door opener or automobile security system. PID 6D includes platen 15 at the top of housing 42, and three function buttons. For an automobile security system the function buttons can be a driver door button 60, a trunk button 62 and an alarm button 64. Buttons 60, 62, and 64 can be adapted for use with other host systems having different functions.

Optics unit 12 can be an image sensor module available from Fingerscan PTY Ltd (an Identix company), of Sydney, Australia, as part of their F3 OEM Kit. The entire F3 OEM Kit manual, published in 1998, is incorporated herein by reference. Platen 15 and imaging device 14 have a usable area of about 16 mm×18 mm. Imaging device 14 in the F3 OEM kit is a CMOS device that provides a video output comprising an analog fingerprint image signal representing an image of a finger placed on platen 15. The fingerprint image signal is communicated to processing unit 16 via a six-wire connector 68, which is shown in a circuit diagram illustrated in FIG. 9.

Most of processing unit 16 is also included in the F3 OEM Kit. Referring again to FIG. 9, processor circuit 18 includes an SH7034 32-bit RISC microprocessor 70, made by Hitachi of Japan. Microprocessor 70 communicates over an 8-bit data bus 72 with external memory 20 and A/D 22, and over control lines 74, 76 with optics unit 12. The SH7034 microprocessor 70 has a 64 KB internal programmable read only memory (PROM) engine and an internal 4 KB static random access memory (SRAM).

In the PROM resides a Fingerscan Biometrics Engine (FBE), which includes algorithms for capturing and processing fingerprint image signals. These algorithms allow a finger image of approximately 140 Kbytes to be converted into a finger model, or template, of approximately 120 bytes. This size saves memory and improves the speed of processing by decreasing the time it takes to transfer finger models to and from the internal memory. The FBE includes special instruction sequences to optimize the following operations: image capture and background rejection; video signal filtering and digitizing; template matching; finger presence detection; false finger detection; and power on self test.

A/D 22 converts the analog video signal from optics unit 12 into digital data that is stored in memory for subsequent use by processor circuit 18. Memory 20 also stores the finger template of the user who is enrolled in PID 6, and also stores custom written code. Microprocessor 70 controls and has access to 1 Mbyte in DRAM 78 and 512 Kbytes of external flash memory in PROM 80. DRAM 78 includes two NEC 424400 chips, and PROM 80 is an AMD 29F040 chip.

In one embodiment of communication unit 24, transmitter module includes an induction loop data link, which is configured as a short-range (<0.5 m) wireless modem, operating at 1200 Baud, at 70 KHz carrier frequency, using amplitude shift keying modulation. The protocol is half duplex, carrier detect multiple access (modified aloha) and the software includes a CRC 16 packet error correction method. A processor included in transmitter module is based on a PIC16C72 device. The transmit current is typically 1 mA.

In the embodiment illustrated in FIG. 9, encoder 23 resides in code programmed into processing circuit 18. However, as discussed above, other embodiments may base encoder 23 on a dedicated encoder chip, such as the HSC200 or HSC300 KeeLoq® Code Hopping Encoder. A PID may include encryption code residing in processor circuit 18 and also include an encoder chip so that PID can combine the functions of the embodiments illustrated in FIGS. 1 and 2 in a single unit. These encoder chips combine a 32-bit hopping code generated by a non-linear encryption algorithm, with a 28-bit serial number and 6 information bit to create a 66-bit transmission stream. The length of the transmission eliminates the threat of code scanning, and the code hopping mechanism makes the transmission unique, thus rendering code capture and resend schemes useless.

An owner of PID 6 must first "enroll" into the unit. Enrollment is the process of scanning a finger to create an image which is stored as a fingerprint template in memory 20. The user enrolls on the unit by removing the "packing" cover and placing a thumb or finger on platen 15. PID can be configured to automatically start the enrollment routine with this action. Enrollment takes approximately 7 seconds. The resultant template is stored in memory 20. Ideally, PID 6 is configured to enable a user to enroll one finger on each hand so that, if the user injures the finger they usually use for verification, an alternate image is available.

Enrollment preferably permits the user several attempts to check and test the operation on the verify. Instructions and queries would be indicated, for example, by display 50 in this mode (see FIG. 4A). Until the user accepts the enrollment the unit will not transmit signals in any way but will allow any number of attempts to re-enroll and verify (test) the operation. Once committed there is no going back or editing.

If the enrollment is be stored on a removable smart card 54 (see FIG. 4A) along with the ID code and private encryption key files, these would not be accessible to other devices. It allows users to swap their PID 6 and retain their enrolled identifying data on smart card 54, while using other PIDs 6. This is the same process used in digital portable telephones today. A user can take the SIM card out of the telephone and swap phones without any security issues.

Verification is carried out when a user places his finger on platen 15, or presses a verify button if included in PID 6. In the embodiment illustrated in FIG. 4A, the verify button can be a dedicated button, such as the # button 55, or could be any other button or sequence of buttons. Each time the user places his or her finger on platen 15 (or presses the verify button and places their finger on platen 15) the optics unit 12 creates a fingerprint signal indicative of the fingerprint image of the user's finger on platen 15. The fingerprint signal is compared to the stored fingerprint template. If the two are significantly similar, the user's identity is verified to be the enrolled person. Verification takes about 1 second or less once the fingerprint template has been retrieved from storage. The user's fingerprint is always verified with the fingerprint template to allow the use of the encryption key.

In programmable PID's, verification for individual users can be set at various threshold levels to account for users who may have very fine, worn or damaged fingers. In this event the ease of use can be enhanced by reducing their verification threshold. Verification threshold can be set at the time of enrollment.

Once the owner or person controlling the unit is enrolled, the unit can then be "registered" with numerous organizations. The host organization is only interested in knowing the ID code and the public encryption key.

The operation of security system 2 illustrated in FIG. 1 is different from the operation of security system 2A illustrated in FIG. 2. The operation of the embodiment illustrated in FIG. 1 will be described first.

In the first embodiment illustrated in FIG. 1, each of PID 6 and host facility 4 include transmit and receive functions. A communication from PID 6 to host system 30 is encrypted according to an encryption algorithm that employs a private key in encrypting and a public key to decrypt. The public encryption key is associated with PID 6 and therefore also with the enrolled person. The private encryption key is stored or loaded into PID 6 at registration time or at manufacture. When a user registers with each host system 30, the user provides the user's ID code and public key to host facility 4 as part of the user's account record. The public key can be stored by the host system. Alternatively, the user provides the public key to a central authority (trusted third party 39) with which host system 30 can communicate.

Referring now to FIG. 7, a user of PID 6 approaches host facility 4, e.g., an ATM (100). As PID 6 reaches the range of the host facility's receiver module 38, the microprocessor is "powered up." The user may have to select a transmission mode that matches that of host system 30, if more than one transmission mode is available on PID 6. Processor circuit 18 causes transmitter module 28 to transmit the ID code signal without encryption (102). This is received by host receiver module 38 and passed on to host processing unit 32 (104). Host processing unit 32 verifies that the received ID code signal represents a registered ID code (106). If the verification fails, then the access process ends (108). If the ID code is verified, then the account or user information is located, including the public encryption key associated with the registered ID code (110). The public encryption key may have to be retrieved from a remote source, such as a central authority. A large random number is also generated by host processing unit 32 (112), and is passed on to transmitter module 40. Transmitter module 40 transmits a random number signal indicative of the random number to PID 6 (114). Receiver module 26 passes the random number signal to processing unit 16 (116). PID 6 performs a user verification (118). If the verification fails, the process ends (108). Alternatively, PID 6 can display a prompt to try again. If the user's identity is successfully verified as a match with the enrolled person based upon a comparison of the stored fingerprint template and a fingerprint image signal generated when the user places his finger on platen 15, the private encryption key associated with PID 6 is used to encrypt the random number according to an encryption algorithm (120). Processing unit 16 causes transmitter module 28 to transmit a signal representing the encrypted random number to host system 30 (122), where host processing unit 32 uses the public encryption key to decrypt the encrypted random number (124). Host processing unit 32 then determines if the decrypted random number matches the random number (126). If this is successful, then the user is granted access to the host facility (128). If this verification fails, the user is denied access (108). The step of verifying the identity of the user with the biometrics (118) can be performed at other junctures of the process, such as prior to transmitting the ID code signal (102), however, it must be carried out before encrypting the random number (120).

Hardware for host system 30 can include a small communication unit 8 with a sensor, such as an RF antenna. Processor circuit 34 can include a CPU to generate a random number, to verify the ID code received from PID 6, to decrypt the encrypted random number received from PID 6, and to compare the decrypted random number with the earlier generated random number.

As these transmissions are random, there is no possibility of scanning or tracking the codes other than to find the original ID code, which is effectively of no real use. The random number generators are such that they will always produce unique codes.

If a host system 30, such as a bank, a store, or a credit card company, implements this system, it would have the users register by presenting themselves with their PID 6 and the required personal identification papers, which is no different than current methods of obtaining a bank card to access accounts with an ATM. The bank or other host system 30 would ask the user to complete a verify on their PID 6 and read the ID code and test the send and receive of the encryption codes. This would establish the public key with the bank and confirm the private key in PID 6. The user is now ready to use the system. Note that the bank does not have the user's fingerprint template—it only has the ID code and the public encryption key. Therefore there is no privacy issue regarding release of the user's fingerprint template.

After the user registers, verification is as described above. From the bank's point of view, the ATM (for example) commences normal operation. The user, instead of entering a bank card and a personal identification number (PIN), may simply press a verify pad or button on their PID 6 while placing their finger on platen 15. The ATM receiver reads the ID code, and if the code is valid generates a large random number, and transmits the number to the user's PID 6. If the validation is successful, PID 6 then encrypts the random number using the private encryption key according to the encryption algorithm, and transmits the result back. The bank system checks the result using the public encryption key and confirms the correct identity of the user. The transaction proceeds.

The bank's ATM will typically be connected to the Bank central system via network 42. Network 42 can be used for transmitting signals between the ATM and the bank central system where the CPU and data bases may be located.

The private encryption key can only be used after a verify, host system 30 knows the ID is correct as the key is unique to that user. Therefore, only that user could be carrying the reader. The key may well be installed during manufacture but only released after the unit is loaded with a template.

In a second mode of operation, typically used in car alarm systems and the like, PID 6A is configured as shown in FIG. 2 to transmit, and host facility 4A is configured to only receive. Receiver module 38 is a standard automobile or garage door type of installation. There is no special adaptation other than the required alarm or immobilizer installation. These systems include a "learn" mode, which is used to program in the new system. In learning a registering person's PID 6A, the host system 4A learns the ID code, the synchronization counter timing, and the encryption key of that PID 6A. This process is essentially the same as the learning process for many current model garage door openers, automobile security systems and the like.

Referring to FIG. 8, to obtain access to host facility 4A, the user activates PID 6A by placing a finger on platen 15. PID 6A performs a user verification from the internally stored fingerprint template (200). If the verify succeeds, processing unit 16A causes encoder 23A to generate an encrypted signal (202). If not successful, the process ends (204). The encrypted signal includes the unencrypted ID code of PID 6, encrypted synchronization counter information and unencrypted function button information. The encryption employs the encryption key resident in encoder 23A. Transmitter unit 28 then transmits the encrypted signal to host facility 4A (206). Host facility 4A than passes the encrypted signal to host processing unit 32A, which checks the ID code for a match with the ID code of a registered user (208). Typically, there will be only a small number of registered users for car lock and garage door systems, and each may have the same ID code and encryption key. If there is no match, then the process ends (204). If there is a match, host processing unit 4A retrieves the stored encryption key and decrypts the encrypted portion of the received encrypted signal (210). Host processing unit then verifies that the synchronization counter information in the decrypted signal matches stored synchronization counter information in memory 36 (212). If the synchronization counter information does not match the stored information, then the process ends (204). If the synchronization counter information matches the stored information, then the user is granted access to host facility 4A (214). The access granted is determined by the function button information contained in the encrypted signal.

In both embodiments, the PID unit can be set in a low power "StandBy" or "Off" function, or could be powered on by the action of pressing the platen.

There are a large number of alternative applications. For example, a hotel could employ the invention in a door lock security system. A hotel registrant would be register his PID with the hotel. The hotel would identify the user's ID code to the lock on his room's door. A member of the hotel staff would carry a master PID which would configure the door to that PID and some other master PID for hotel staff. There would be no need for a hard wired communications system to each door unless central control is required.

The biometric sensor 11 may include a direct contact device instead of an optic sensor unit 12. Direct contact capacitive chip fingerprint sensors can be obtained from SGS Thomson Microelectronics, of Phoenix Ariz., from Veridicom, Inc., of Santa Clara Calif., and from Harris Semiconductor, of Melbourne, Fl. A direct contact thermal sensor may also be used for fingerprint sensing.

Other embodiments are within the scope of the claims.

What is claimed is:

1. A method of providing secure access to a host facility, comprising:
   registering one or more persons with the host facility, including storing a unique ID code and a public encryption key for each registered person;
   receiving a first transmission comprising a first user signal at the host facility;
   generating and then transmitting a random number signal only if the first user signal represents one of the stored ID codes;
   receiving a second transmission comprising a second user signal at the host facility;
   decrypting the second user signal with the public encryption key associated with the registered person who is also associated with the stored ID code represented by the first user signal; and
   providing access to the host facility only if the decrypted second user signal represents the random number.

2. A method of providing access to a secure host facility only to registered persons, comprising:
   registering one or more registered persons with the host system, wherein registering each registered person includes storing an ID code associated only with a portable hand-held device under the control of that registered person;
   transmitting an ID code signal from a portable hand-held device to a facility of the host system, wherein the ID code signal represents an ID code associated with the transmitting device;
   generating, at the host facility, a random number signal representing a random number in response to the ID code signal only if the ID code signal is representative of the ID code of the device controlled by one of the registered persons;
   retrieving, with the host system, a public key associated with the one of the registered persons only if the ID code signal is representative of the ID code of the one the device controlled by the one of the registered persons;
   transmitting the random number signal from the host facility to the transmitting device;
   receiving the random number signal with the transmitting device;
   generating a user fingerprint signal representing a fingerprint image of a user's finger being placed on a platen of the transmitting device;
   comparing, with the transmitting device, the user fingerprint signal to a fingerprint template stored in the transmitting device, the fingerprint template representing a fingerprint image of a person who is enrolled with the transmitting device;
   encrypting the random number signal with the transmitting device, the random number signal being encrypted according to an encryption algorithm employing a private key associated only with the transmitting device;
   transmitting the encrypted random number signal from the transmitting device to the host facility only if the fingerprint image represented by the user fingerprint signal corresponds sufficiently to the fingerprint image represented by the fingerprint template to verify that the user is the enrolled person;
   decrypting the encrypted random number signal with the host system, including employing the retrieved public key; and
   providing the user access to the host facility only if the decrypted encrypted random number signal represents the random number.

3. The method of claim 2, wherein retrieving the public key includes retrieving the public key from a trusted third party.

4. The method of claim 2, wherein transmitting the ID code signal, transmitting the random number signal, and transmitting the encrypted random number signal each includes transmitting via a wireless transmission.

5. The method of claim 2, wherein transmitting the ID code signal, transmitting the random number signal, and transmitting the encrypted random number signal each includes transmitting via at least one of a modem, a cable access TV line, and a computer communication medium.

6. A method of providing a secure function at a host facility only to a registered person, comprising:
   registering a person with the host facility by storing an ID code associated only with a portable registered device controlled by the registered person, learning a synchronization counter of the registered device, storing an encryption key associated with the registered device and associating the encryption key of the registered device with the stored ID code;
   generating a user fingerprint signal representing a fingerprint image of a user's finger being placed on a platen of a portable user device;
   comparing, with the user device, the user fingerprint signal to a fingerprint template stored in the user device, the fingerprint template representing a fingerprint image of an enrolled person who is enrolled with the user device;
   generating an access signal with the user device only if the fingerprint image represented by the user fingerprint signal corresponds sufficiently to the fingerprint image represented by the fingerprint template to verify that the user is the enrolled person, the access signal comprising an ID code associated only with the user device, button press information representing a requested function, and encrypted data encrypted with an encryption key associated with the user device, the encrypted data including a synchronization counter associated with the user device;
   transmitting the access signal from the user device to the host facility;
   determining, with the host facility, if the ID code in the access signal matches the stored ID code;
   retrieving the encryption key of the registered device if the match is successful;
   employing the encryption key of the registered device to decrypt the encrypted data and determine the synchronization counter of the user device;

comparing the synchronization counter of the user device with the synchronization counter of the registered device; and providing the requested function represented by the button press data only if the synchronization counter of the user device matches the synchronization counter of the registered device.

7. A method of providing secure access to a host facility, comprising:

registering one or more persons with the host facility, including storing a unique ID code and a public encryption key for each registered person;

receiving a first wireless transmission comprising a first user signal at the host facility from a portable hand-held device under the control of a registered person;

generating and then wirelessly transmitting a random number signal only if the first user signal represents one of the stored ID codes;

receiving a second wireless transmission comprising a second user signal at the host facility from the portable hand-held device;

decrypting the second user signal with the public encryption key associated with the registered person who is also associated with the stored ID code represented by the first user signal; and providing access to the host facility only if the decrypted second user signal represents the random number.

8. A portable, hand-held personal identification device for providing secure access to a host facility, comprising:

a biometric sensor system capable of sensing a biometric trait of a user that is unique to the user and providing a biometric signal indicative thereof;

a processing unit responsive to the biometric signal, being adapted to compare the biometric signal with stored biometric data representative of the biometric trait of an enrolled person that is indicative of the identity of the enrolled person, and to provide a verification signal; and a communication unit, including a transmitter circuit, adapted to transmit the verification signal to a remote host system;

wherein the processing unit includes a processor circuit, a memory and an encoder, wherein the memory stores the biometric data, and wherein the verification signal includes an encrypted signal encrypted by the encoder;

wherein the encoder comprises an encryption algorithm, and wherein the encryption algorithm employs a private key indicative of the enrolled person or the device; and wherein the communication unit further includes a receiver circuit, wherein the memory further stores an ID code indicative of the enrolled person or the device, wherein the processing unit is further adapted to first cause the transmitter circuit to transmit an ID code signal indicative of the ID code to the remote host system, wherein the receiver circuit is adapted to receive a host response signal which is transmitted by the remote host system only if the ID code signal matches an ID code stored at the remote host system, and wherein the processor unit employs the encryption algorithm and the private key to encrypt the host response signal to create the verification signal, and causes the transmitter circuit to transmit the verification signal to the remote host system only if the biometric signal corresponds sufficiently to the biometric data to verify that the user is the enrolled person.

9. The personal identification device of claim 8, wherein the biometric sensor system includes a fingerprint sensor.

10. The personal identification device of claim 9, wherein the fingerprint sensor includes a platen adapted for placing a finger thereon.

11. The personal identification device of claim 10, wherein the fingerprint sensor further includes an optical image sensor.

12. The personal identification device of claim 8, wherein the biometric sensor system includes an optical image sensor.

13. The personal identification device of claim 12, wherein the optical image sensor comprises a CMOS chip.

14. The personal identification device of claim 8, wherein the encoder comprises an encoding circuit, and wherein the verification signal further comprises an ID code indicative of the enrolled person or the device.

15. The personal identification device of claim 8, wherein the memory is located in a removable plug-in module, the personal identification device further comprising a socket adapted to receive the module.

16. The personal identification device of claim 8, wherein the communication unit further includes a receiving circuit being adapted to receive a host response signal from the host system.

17. The personal identification device of claim 8, wherein the communication unit is adapted for remote communication with the host system via a wireless communication medium.

18. The personal identification device of claim 8, further comprising a display.

19. The personal identification device of claim 18, further comprising a keypad.

20. A portable, hand-held personal identification device for providing secure access to a host facility, comprising:

a biometric sensor system capable of sensing a biometric trait of a user that is unique to the user and providing a biometric signal indicative thereof;

a processing unit responsive to the biometric signal, being adapted to compare the biometric signal with stored biometric data representative of the biometric trait of an enrolled person that is indicative of the identity of the enrolled person, and to provide a verification signal only if the biometric signal corresponds sufficiently to the biometric data to verify that the user is the enrolled person; and a communication unit, including a transmitter circuit, adapted to transmit the verification signal to a remote host system;

wherein the biometric sensor system includes a fingerprint sensor and wherein the biometric trait is a fingerprint;

wherein the communication unit further includes a receiver circuit adapted to receive a signal transmitted by the remote host system;

wherein the processing unit includes memory to store an ID code associated only with the device, a personal encryption key associated only with the device, and the biometric data;

wherein the processing unit is further adapted to first cause the transmitter circuit to transmit an ID code signal indicative of the ID code to the host system, wherein the receiver circuit is adapted to receive a host response signal which is transmitted by the remote host system only if the ID code signal matches an ID code stored at the remote host system, and to employ the encryption algorithm and the private encryption key to create the verification signal by encrypting the host response signal.

21. The personal identification device of claim 20, wherein the memory is located in a removable plug-in module, the personal identification device further comprising a socket adapted to receive the module.

22. A portable, hand-held personal identification device for providing secure access to a host facility, comprising:

a housing;

a fingerprint sensor system capable of sensing a fingerprint of a user and providing a fingerprint signal indicative thereof, the fingerprint sensor system including a platen on a surface of the housing adapted to receive a finger;

a communication unit in the housing being adapted for wireless communication with a separate host system, including a transmitting circuit and a receiving circuit;

a processing circuit; and a slot in the housing for receiving a smart card that includes a memory;

wherein the memory in the smart card stores a fingerprint template representative of the fingerprint of an enrolled person, and an ID code and a personal encryption key being associated with the device, wherein the processing circuit is adapted to cause an ID code signal indicative of the ID code from memory to be transmitted by the transmitting circuit, and wherein the processing circuit is further adapted to cause a host response signal received by the receiving circuit, and which is only transmitted if the ID code signal matches an ID code stored at the host system, to be encrypted according to an encryption algorithm employing the personal encryption key and to cause the encrypted host response signal to be transmitted by the transmitting circuit only if the fingerprint signal corresponds sufficiently to the fingerprint template to verify that the user is an enrolled person.

23. The personal identification device of claim 22, further comprising an alphanumeric display.

24. The personal identification device of claim 23, further comprising a keypad for inputting data.

25. A portable, hand-held personal identification device for providing secure access to a host facility, comprising:

a biometric sensor system capable of sensing a biometric trait of a user that is unique to the user and providing a biometric signal indicative of the biometric trait;

a processing unit responsive to the biometric signal, being adapted to compare the biometric signal with stored biometric data representative of the biometric trait of an enrolled person that is indicative of the identity of the enrolled person, and to provide a verification signal only if the biometric signal corresponds sufficiently to the biometric data to verify that the user is the enrolled person; and a communication unit, including a transmitter circuit, adapted to transmit the verification signal and an ID code signal to a remote host system associated with the host facility, wherein the ID code signal is indicative of an ID code associated only with the portable device, and wherein the host system provides access to the host facility in response to the verification signal only if host system determines that the personal device associated with the ID code belongs to a registered person.

26. A method of accessing a secure host facility, comprising:

sensing a biometric trait of a user that is unique to the user with a biometric sensor system of a portable device, and providing a biometric signal indicative of the biometric trait;

comparing, with the portable device, the biometric signal with stored biometric data representative of the biometric trait of an enrolled person that is indicative of the identity of the enrolled person;

providing a verification signal only if the biometric signal corresponds sufficiently to the biometric data to verify that the user is the enrolled person;

encrypting the verification signal;

wirelessly transmitting the encrypted verification signal and an ID code signal to a remote host system associated with the host facility, wherein the ID code signal is indicative of an ID code associated only with the portable device;

decrypting the encrypted verification signal only if the personal device associated with the ID code belongs to a registered person; and providing access to their host facility only if certain verification information in the decrypted verification signal matches information stored at the host system.

27. A portable, hand-held personal identification device for providing secure access to a host facility, comprising:

a biometric sensor system capable of sensing a biometric trait of a user that is unique to the user and providing a biometric signal indicative of the biometric trait;

a processing unit responsive to the biometric signal, being adapted to compare the biometric signal with stored biometric data representative of the biometric trait of an enrolled person that is indicative of the identity of the enrolled person, and to provide an encrypted verification signal only if the biometric signal corresponds sufficiently to the biometric data to verify that the user is the enrolled person; and a communication unit, including a transmitter circuit, adapted to wirelessly transmit the encrypted verification signal and an ID code signal to a remote host system associated with the host facility, wherein the ID code signal is indicative of an ID code associated only with the portable hand-held device, and wherein the host system decrypts the encrypted verification signal only if the host system determines that the portable hand-held device associated with the ID code belongs to a registered person and provides access to the host facility only if certain verification information in the decrypted verification signal matches verification information stored at the host system.

* * * * *